POWER SUPPLY SWITCHING CIRCUIT
Filed Oct. 22, 1954
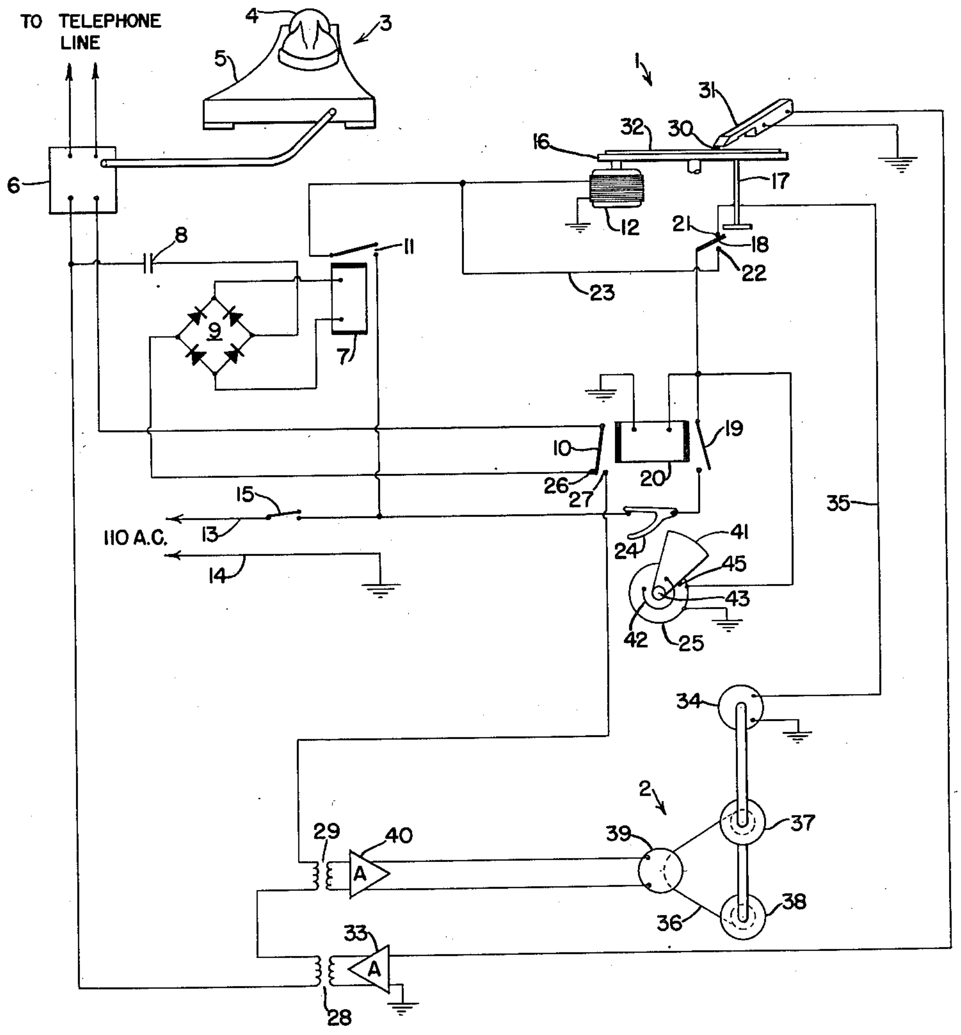
INVENTOR.
JOSEPH J. ZIMMERMANN
BY Andrus + Sceales
Attorneys United States Patent Office 2,769,859

Patented Nov. 6, 1956

2,769,859

POWER SUPPLY SWITCHING CIRCUIT

Joseph J. Zimmermann, Milwaukee, Wis., assignor to The Electronic Secretary, Inc., Milwaukee, Wis., a corporation of Wisconsin Application October 22, 1954, Serial No. 463,850

7 Claims. (Cl. 179—6)

This invention relates to a power supply switching circuit for sequentially supplying power to more than one load and more particularly to such a circuit which is initiated by an intermittent or pulsating signal.

When an intermittent signal is employed to periodically close a switch in the power connection to various loads and the loads are to be sequentially energized after the signal ceases, a latching circuit is generally employed to shunt or by-pass the periodically closed switch. The completion of the latch circuit is generally effected after a predetermined period of the intermittent signal. The latch circuit connects the various loads to be sequentially energized across the power supply with a normally open switch preventing the energization of each individual load. A separate timer selectively closes the normally open switch associated with each load to energize the load in a predetermined sequence.

An example of the above variety of loading is a telephone answering apparatus which has an outgoing message reproducer and an incoming message recorder operatively associated with a telephone line circuit to automatically answer an incoming call. The answering apparatus is initially actuated by the incoming ringing signal to complete the power circuit and start a cycle of operation. Thereafter, the outgoing message reproducer transmits a previously recorded message informing the calling party that he may leave a message. At the end of the outgoing message, the message recorder is operatively connected to the telephone line circuit to record a message from the calling party. The apparatus generally returns to standby position after a predetermined period of operation.

In accordance with the present invention, the intermittent signal switch actuates a driving mechanism to move a common pole of a load switch from an initial position to a second position. The load switch in the second position is connected across the supply line in series with the signal switch and a latch actuator. Therefore, the latch actuator is energized when the load switch and signal switch are simultaneously in a closed position. The latch actuator being energized closes a latch switch which maintains one side of the load switch connected to one side of the power supply and also maintains the energization of the latch actuator independently of the intermittent signal switch and the load switch. A separate timer opens the circuit of the latch actuator to open the latch switch and thereby disconnect the load switch from the power supply.

The drawing furnished herewith illustrates the best mode presently contemplated of carrying out the invention as set forth hereinafter.

In the drawing, there is illustrated a schematic diagram of the invention.

Referring to the drawing, the illustrated embodiment of the invention comprises generally a phonograph 1 and a wire recorder 2 operatively connected in the telephone circuit of a telephone 3 to automatically answer an incoming call. The phonograph 1 first transmits an outgoing message to the calling party and the wire recorder 2 subsequently records an incoming message.

The telephone 3 is shown for purposes of illustration as a standard desk set variety having a handset 4 and a base unit 5 connected to a telephone line circuit, not shown, through a line block 6.

To actuate the answering apparatus, a triggering relay 7 in series with a condenser 8, a full wave rectifier 9 and a normally closed switch 10 is connected across the telephone line circuit via the line block 6.

A direct current normally flowing in the conventional telephone line circuit is stopped by the blocking condenser 8 to prevent the direct current from reaching the direct current relay 7.

The ringing current being an alternating current is not blocked by the condenser 8 and the relay 7 is therefore energized by an incoming ringing current which is rectified by the bridge rectifier 9. The energized relay 7 closes a set of normally open contacts 11.

The triggering contacts 11 are connected in a series circuit with a phonograph motor 12 of the phonograph 1 to supply lines 13 and 14 of an alternating current source, not shown.

The supply line 14 is shown as the grounded or cold line and one terminal of the equipment will be similarly grounded to show the completed connection to the supply lines. A master switch 15 in the supply line 13 controls the energization of the apparatus by the alternating current source.

With the phonograph motor 12 and contacts 11 in a series circuit across the supply lines 13 and 14, the phonograph motor 12 is energized during each incoming ringing signal.

The phonograph motor 12 drives the turntable 16 through an automatic turntable mechanism described in U. S. Patent No. 2,394,539, dated February 12, 1946. A retractable pin 17, shown in an elevated position in the drawing, is a part of the clutch device in the referred to patent and is employed in the present invention to actuate a low pressure switch blade 18. At a predetermined operating point of the phonograph, the pin 17 lowers and depresses switch blade 18.

The switch blade 18 is connected to the power supply line 13 through a normally open latch switch 19 which is actuated by a latching relay 20, as described hereinafter. Therefore, the switch blade 18, as shown, is normally at zero or no potential. A first contact 21 is engaged by the switch blade 18 when the latter is in a non-actuated position, as shown in the drawing. A second contact 22 is engaged by the switch blade 18 when the latter is in a depressed or actuated position.

The contact 22 is connected to the ungrounded side of the phonograph motor 12 by a conductor 23. When switch blade 18 engages contact 22 and latch switch 19 closes, the phonograph motor 12 is energized independently of the triggering contacts 11 as follows: starting with supply line 13, a normally closed timer switch 24 to be hereinafter described, latch switch 19, switch blade 18, contact 22, conductor 23, motor 12 and ground back to the grounded supply line 14.

The switch 19 is closed by the latching relay 20, previously referred to. The relay 20 is connected to the switch blade 18 and has its opposite side grounded. To initially energize relay 20, the triggering contacts 11 must be closed and switch blade 18 must be simultaneously engaged with contact 22 whereupon a circuit is traced as follows: supply line 13, triggering contacts 11, conductor 23, contact 22, switch blade 18, relay 20 and ground to the grounded conductor 14. Subsequent to the initial energization of the relay 20, the latch switch 19 is closed and maintains the energization of the relay 20 until a cyclic timer 25 trips the timer switch 24 which disconnects the apparatus and returns it to standby position by breaking the connection to the power line 13.

The relay 20 also actuates the switch 10 which normally engages a contact 26 to complete the circuit to the trigger relay 7. When the relay 20 is energized, the switch 10 disengages contact 26 and engages a contact 27 to connect the outgoing message transformer 28 and the recording transformer 29 in series and across the telephone line circuit via the telephone line block 6. The placing of the transformers 28 and 29 across the telephone circuit loads the telephone circuit and simulates the answering of the telephone.

The phonograph 1 completes a cycle of operation due to the completion of the latching circuit and consequent continued energization of the phonograph motor 12, previously described. A phonograph pickup 30 carried in a tone arm 31 travels across a record 32 which is carried by the turntable 16 and has a previously recorded message thereon. The pickup 30 is connected to the input of an outgoing message amplifier 33 which is connected across the telephone line circuit via the outgoing message transformer 28 and the line block 6. The outgoing message is thus transmitted to the calling party. Normally the outgoing message informs the calling party that the apparatus is in operation and that a recording may be made.

Following the outgoing message on the record there is a conventional widely spaced throw-out groove, not shown, which brings the pickup 30 and tone arm 31 rapidly to the center of the record 32. The movement of the tone arm 31 to the center of the record causes a retraction of the pin 17 as described in the referred to patent.

As a result of the retraction of pin 17, the switch blade 18 disengages the contact 22 and thereby breaks the power circuit to the phonograph motor 12. In returning to the non-actuated position, the switch blade 18 engages the contact 21 previously noted.

The contact 21 is connected to one terminal a motor 34 which is adapted to operate the wire recorder 2. The other terminal of the motor 34 is grounded and a power circuit is traced for the wire recorder motor 34 as follows: starting with supply line 13, timer switch 24, latch switch 19, switch blade 18, contact 21, a conductor 35, motor 34 and ground back to the grounded supply line 14.

The motor 34 is adapted to drive a record wire 36 which is wound on two spaced spools 37 and 38 through an electromagnetic recording head 39 of the wire recorder 2. The recording transformer 29 connects the input of a record amplifier 40 across the telephone line circuit via the line block 6. The output of the amplifier 40 is connected to the input of the recording head 39. In this manner, an incoming message is recorded on the record wire 36.

A period of one complete cycle is controlled by the overall cyclic timer-motor 25, previously noted. The motor 25 is connected in parallel circuit with the latching relay 20 and the timer-motor 25 drives a cam 41 toward the timer switch 24 which is connected in the power line 13. At the end of a cycle, the cam 41 momentarily engages and opens the switch 24 which breaks the power circuit to the apparatus. A coil spring 42 is wound about the shaft 43 carrying the timer cam 41 and has one end connected to the cam 41 and the opposite end connected to the motor casing as at 44. As the timer cam 41 is driven toward the switch 24, the coil spring 42 is wound so that when the motor 25 is de-energized the spring returns the timer cam 41 to an initial position against a stop pin 45.

The operation of the telephone answering and message recording apparatus illustrated in the accompanying drawing is described as follows:

Assume the apparatus is set for automatic operation by closing the master switch 15.

An incoming ringing signal or current energizes the trigger relay 7 and consequently the phonograph motor 12 operates for the duration of each ring. After the motor has operated for several incoming signals, the turntable mechanism of the phonograph 1 moves the retractable pin 17 from its elevated position to a depressed position. The movement of the pin 17 closes switch blade 18 with contact 22 and opens switch blade 18 from contact 21. If a ringing signal occurs when the switch blade 18 and contact 22 are engaged such that the triggering contacts 11 are closed, the latching relay 20 is energized and closes the latching switch 19.

When switch 19 closes, the switch blade 18 is connected to the power line 13 and provides power to maintain operation of the phonograph motor 12 independently of the triggering contacts 11.

Further, closed switch 19 maintains energization of the overall timer-motor 25 and the latching relay 20.

The phonograph 1 runs its cycle, with the pickup 30 and tone arm 31 traveling toward the center of the record 32. The outgoing message is amplified by amplifier 33 and transmitted to the calling party over the telephone line circuit via the transformer 28 and line block 6.

Although the recording transformer 29 has a winding in series with the outgoing message transformer 28, the outgoing message is not recorded on the record wire 36 as the wire recorder motor 34 is not operating at the time the outgoing message is being transmitted.

Immediately following the outgoing message the movement of the pickup 30 and tone arm 31 to the center of the record causes elevation or retraction of the pin 17. Consequently, the switch blade 18 disengages from contact 22 and engages with contact 21 with a resultant de-energization of the phonograph motor 12 and energization of the wire recorder motor 34. The residual motion of the phonograph turntable 16 operates, as described in the referred to patent, to elevate the tone arm and move the same to the outer edge of the record.

An incoming message is received from the telephone line circuit via the line block 6 and the record transformer 29. After amplification of the signal by the record amplifier 40, the message is recorded on the record wire 36 which passes through the electromagnetic head 39.

After a predetermined period of cyclic operation, the timer cam 41 engages switch 24 and the apparatus is disconnected from the supply lines 13 and 14. The spring 42 returns the cam 41 to standby position against stop pin 45 and the apparatus is in position to answer another incoming call in the same manner as just described.

Various modes of carrying out the invention are contemplated as within the scope of the following claims particularly pointing out and distinctly claiming the subject matter which is regarded as the invention.

I claim:

1. In a power supply circuit for sequentially supplying power to a first load and a second load, an intermittent switch means connected in series with the first load and a source of power to periodically energize the first load, a load switch means having a first position connected to the second load and a second position connected to the first load to supply power to the respective loads, a latch switch connected between the load switch means and the source of power to maintain the load switch normally disconnected from the source of power, means responsive to the operation of the first load to move the load switch means from said first position to said second position and maintain the load switch in the second position for the duration of the first load operation, timing means to discontinue the operation of the first load and thereby return the load switch means to the first position to effect an energization of the second load, and a latch means responsive to simultaneous operation of the intermittent switch means and the closing of the load switch to said second position to initiate and maintain the latch switch in an actuated position to effect the connection of the load switch to the source of power.

2. In a power supply circuit for sequentially supplying power to a first load and a second load, an intermittent switch in series connection to a power supply and the first load, means to actuate the intermittent switch to periodically complete a power circuit to the first load, a load switch having common pole movable between a non-actuated position adapted to connect the second load to the power supply and an actuated position adapted to connect the first load to the power supply, a latch actuator connected to the power supply in series with the intermittent switch and the load switch in said second position whereby the latch actuator is energized upon the simultaneous closing of said intermittent switch and said load switch, means responsive to a predetermined period of intermittent suplpy of power to the first load to move the common pole from said non-actuated position to said actuated position and thereby effect an energization of the latch actuator, switch means operatively connected with the latch actuator and with the power supply and with the common pole whereby said latch actuator is energized independently and said common pole is connected to the power supply independently of said intermittent switch and said load switch, and timing means adapted to return said common pole to a non-actuated position to connect the second load to the power supply.

3. A power supply circuit for sequentially supplying power to a first load and a second load, which comprises a normally open switch connecting said first load to a power source, means to intermittently close said switch and thereby periodically energize the first load, a load switch having a non-actuated position in electrical circuit connection with said second load and having an actuated position in electrical circuit connection with said first load, means responsive to a predetermined operation of the first load to move the load switch to an actuated position, a normally open latch circuit connecting said load switch to the power source, a latch actuator adapted to close said normally open latch circuit and thereby main- the load switch and the actuator connected to the power source, said latch actuator being connected in series circuit with said first named normally open switch and said load switch in said actuated position to the source of power to initially energize the latch actuator and close the latch circuit, means responsive to a predetermined period of operation of the first load subsequent to the closing of said latch circuit to return the load switch to the non-actuated position and thereby connect the second load to the power source and to disconnect the first load from the power source, and a timer connected in circuit with the latch circuit and adapted to open the latch circuit.

4. In a power supply circuit for sequentially supplying power to a first load and a second load, a vibratory switch connected to the power source in series with the first load to intermittently supply power to the first load, means to actuate the vibratory switch, a load switch having a common pole biased to a non-actuated position and having an actuated position, said non-actuated position connecting the common pole to the second load and said actuated position connecting the common pole to the first load, a latch switch connected to the power supply and the common pole to alternately connect and disconnect the common pole with the power supply, means responsive to the operation of the first load to move said first named switch from the non-actuated position to the actuated position and thereby connect the first load to the power supply independently of the vibratory switch through said second named switch, means responsive to the simultaneous closing of the vibratory switch and the load switch to an actuated position to lock the latch switch in circuit and thereby maintain the common pole connected to the power source, means responsive to a predetermined period of operation of the first load to move said first named switch to the non-actuated position and thereby disconnect the first load from the power source and connect the second load to the power source through said common pole, and timing means to open the circuit connection between the common pole, and the power supply to disconnect the first and second load from the power supply after a predetermined period.

5. In an automatic telephone answering and message recording apparatus operatively associated with a telephone circuit, a reproducer operatively associated with the telephone circuit to transmit a previously recorded message, a recorder operatively associated with the telephone circuit to record an incoming message, a triggering switch responsive to an incoming ringing signal to supply power to the reproducer during the ringing signal, load switching means having a first position electrically connecting the recorder to a source of power and a second position electrically connecting the reproducer to a source of power, latch switch means to effect a connection of the load switching means to the source of power, means responsive to a predetermined operation of the reproducer to move the load switching means to the second position, a latch actuator responsive to the simultaneous closing of the triggering switch and the load switching means to said second position to lock said latch switch means in position connecting the load switching means to the source of power.

6. In an automatic telephone answering and message recording apparatus, a reproducer operably associated with a telephone circuit to transmit a previously recorded message, a recorder operably associated with the telephone circuit to record an incoming message, a load switch having a common pole connected to a source of power and having a first position connected to the wire recorder to effect a recording of an incoming message and a second position connected to the reproducer to effect a transmittal of the previously recorded message, a normally open latch switch between the common pole and the source of power to maintain the common pole normally disconnected from the source of power, a latch actuator connected in circuit with the latch switch and source of power and being adapted to close the normally open latch switch, a trigger switch connected between the reproducer and the source of power, means responsive to an incoming ringing signal in the telephone circuit to close the trigger switch for the duration of each signal, a circuit connecting the trigger switch and the load switch in the second position and the latch actuator to the source of power to energize the latch actuator and effect a closing of the latch switch upon the simultaneous closing of the trigger switch and the load switch to the second position, means responsive to the closing of the trigger switch to move the load switch from the first position to the second position and consequently energize the latch actuator and close the latch switch, said last named means maintaining the load switch in the second position for the duration of the transmission of the previously recorded message, and means to return the load switch to the first position after the transmission of the previously recorded message and thereby energize the recorder to effect the recording of an incoming message.

7. In a telephone answering and message recording apparatus, a reproducer operably associated with a telephone circuit to transmit a previously recorded message thereon, a recorder operably associated with the telephone circuit to record an incoming telephone call, a load switch having a common pole connected to a source of power and adapted to engage a first contact connected to the wire recorder and a second contact connected to the reproducer, said reproducer being operably associated with said load switch to move the common pole from the first contact to the second contact after a predetermined period of operation of the reproducer and to maintain the common pole engaged with the second contact during the transmission of the previously recorded message, a triggering switch responsive to an incoming ringing signal over the telephone circuit and connected in circuit with the reproducer and the source of power to energize the reproducer for the duration of each signal, an electromagnetic latch actuator connected for energization to the power supply in series with the triggering switch and the common pole and the second contact of the load switch, a normally open latch switch actuated by said electromagnetic means and connected to the power supply in a series circuit with the latch actuator and the common pole of the load switch to maintain energization of the latch actuator and to maintain power on the common pole and thereby effect a transmission of the previously recorded message, means responsive to the ending of the previously recorded message to return the common pole to the first position and thereby operatively energize the wire record to record an incoming message, and means to open the energization of the latch circuit and thereby return the apparatus to standby position.

References Cited in the file of this patent

UNITED STATES PATENTS

| | | |
|---|---|---|
| 2,080,812 | Fairbanks | May 18, 1937 |
| 2,374,842 | Shively et al. | May 1, 1945 |
| 2,713,088 | Van Deventer et al. | Dec. 17, 1949 |